United States Patent [19]

Lehmann et al.

[11] Patent Number: 5,707,531
[45] Date of Patent: Jan. 13, 1998

[54] PROCESS FOR BREAKING OIL EMULSIONS

[75] Inventors: Bernhard Lehmann, Aachen; Ulrich Litzinger, Hachenburg, both of Germany

[73] Assignee: Bayer Aktiengesellschaft, Leverkusen, Germany

[21] Appl. No.: 693,921

[22] Filed: Aug. 5, 1996

[30] Foreign Application Priority Data

Aug. 11, 1995 [DE] Germany ............... 195 29 602.8

[51] Int. Cl.$^6$ ................................................ B01D 17/04
[52] U.S. Cl. ................. 210/708; 210/725; 210/728; 210/735; 210/736; 252/344; 252/358
[58] Field of Search ............................. 210/708, 725, 210/728, 735, 736; 252/344, 358

[56] References Cited

U.S. PATENT DOCUMENTS

| 2,923,701 | 2/1960 | Schuller et al. |
|---|---|---|
| 3,288,770 | 11/1966 | Butler. |
| 3,461,163 | 8/1969 | Boothe. |
| 3,907,701 | 9/1975 | Liebold et al. ............... 252/344 |
| 3,972,939 | 8/1976 | Spielberger et al. |
| 4,077,930 | 3/1978 | Lim et al. ................... 210/735 |
| 4,089,803 | 5/1978 | Bessler ........................ 252/344 |
| 4,382,852 | 5/1983 | McCoy et al. ............... 210/708 |
| 4,434,850 | 3/1984 | McCoy. |
| 4,474,682 | 10/1984 | Billenstein et al. ......... 252/358 |
| 4,686,066 | 8/1987 | Hofinger et al. |
| 4,715,962 | 12/1987 | Bhattacharyya et al. .... 210/708 |
| 5,045,212 | 9/1991 | Augustin et al. |
| 5,128,046 | 7/1992 | Marble et al. |
| 5,372,723 | 12/1994 | de Geus et al. ............. 210/639 |
| 5,560,832 | 10/1996 | Sivakumar et al. .......... 210/708 |

FOREIGN PATENT DOCUMENTS 2833654 of 0000 Germany.

*Primary Examiner*—Peter A. Hruskoci
*Assistant Examiner*—Betsey J. Morrison
*Attorney, Agent, or Firm*—Sprung Kramer Schaefer & Briscoe

[57] ABSTRACT

Oil emulsions are broken in a particularly advantageous manner by adding to them a breaker which comprises poly-DADMAC and polyalkylenepolyamines.

6 Claims, No Drawings

PROCESS FOR BREAKING OIL EMULSIONS

BACKGROUND OF THE INVENTION

1. Field of the Invention

The present invention relates to an improved process for breaking oil emulsions, in particular water-in-oil emulsions, using novel emulsion breakers.

The treatment of waste waters comprising oil, in particular comprising mineral oil, is urgently necessary to protect waters and the environment and is laid down by relevant provisions of water law in many countries. Oil emulsions are toxic to fish, even if the oils are non-toxic in the non-emulsified state. Similar actions also occur in low aquatic organisms. On the basis of current environmental protection provisions, it is necessary not only to remove the oil from the waste water but to obtain it in a quality suitable for further use.

2. Description of the Related Art

The improvement of processes for breaking oil emulsions is therefore a continuous task. The separation of oil emulsions, for example of those such as occur when cooling lubricant emulsions and surface cleaners are used in the metalworking industry, is often carried out by addition of cationic polymers. These breakers have the task of breaking the emulsion when used in the lowest possible concentration. The quality criterion of such breakers is the concentration in which they have to be used in order to achieve breaking into a low-oil aqueous phase and a low-water oily phase as completely as possible. Known breakers of this type are, for example, homopolymers of diallyldimethylammonium chloride (=poly-DADMAC) (see, for example, U.S. Pat. Nos. 2,923,701, 3,461,163 and EP-A0 186 029).

One disadvantage of poly-DADMAC breakers is their high specificity, i.e. a given breaker is optimum in respect of the desired separating action only for a specific waste water, and leads to problems with the usually widely varying qualitative and quantitative composition of oil emulsions. Another disadvantage is that the creaming oily phase liberated has a structural viscosity and poor flow properties because of such breakers. Poly-DADMAC breakers are therefore adequately suitable only for some of the possible applications.

Polyamines and derivatives thereof are also known as breakers for oil emulsions (see DE-OS (German Published Specification) 2 351 754 and DE-OS (German Published Specification) 2 833 654). A disadvantage of polyamine breakers is the large mount in which they have to be used in order to obtain satisfactory results.

SUMMARY OF THE INVENTION

A process has now been found for breaking oil emulsions, which is characterized in that mixtures which comprise poly-DADMAC and polyalkylenepolyamine are employed as breakers.

DETAILED DESCRIPTION OF THE INVENTION

Any desired oil-containing emulsions can be broken in the manner according to the invention. For example, it is possible to break according to the invention water-in-oil emulsions, in particular cooling lubricant emulsions, rolling oil emulsions, crude oil/water emulsions, emulsions such as are obtained, for example, as wash liquors, degreasing baths, in paint shop waste waters, oil-containing condensates, tank cleaning waste waters, bilge waters and slop oils, and emulsions such as are obtained during processing of animal and vegetable products. It is in general advantageous for the process according to the invention to separate off any solid constituents present from the breaking emulsion, for example metal particles.

The poly-DADMAC to be employed can be, for example, homopolymers of diallyldimethylammonium chloride which, as a 35% strength by weight solution in water, have a viscosity of 2000 to 20,000 mPa.s at 25° C. Suitable poly-DADMAC can be prepared in a known manner by polymerization of diallyldimethylammonium chloride in an aqueous phase in the presence of free radical initiators at elevated temperature (see, for example, U.S. Pat. No. 3,288,770). If appropriate, the poly-DADMAC can still contain monomeric diallyldimethylammonium chloride, for example 0 to 10% by weight, based on the sum of polymerized and monomeric DADMAC. The poly-DADMAC can be employed as it is obtained during preparation, i.e. as a solution in water.

Poly-DADMAC to be employed according to the invention can have, for example, a molecular weight of 40,000 to 110,000, preferably 70,000 to 80,000. A poly-DADMAC which, as a 35% strength by weight solution in water, has a viscosity of 3000 to 5000 mPa.s (at 25° C.) is preferably used.

Suitable polyalkylenepolyamines can be prepared, for example, by first reacting ammonia with dichloroalkylenes and reacting the products obtainable by this reaction, for example diethylenetriamine, with further dichloroalkylene. Mixtures of polyalkylenepolyamines of different origin can also be employed. The polyalkyleneamines primarily thus accessible can be heated in aqueous solution under reduced pressure, if appropriate, in order to reduce vinylchloride contents to less than the detection limit, and/or degraded by heat under increased pressure, if appropriate, in order to reduce the viscosity (see, for example, DE-OS (German Published Specification) 2 351 754 and DE-OS (German Published Specification) 2 833 654). Particularly suitable polyalkylenepolyamines have, for example, viscosities in the range from 200 to 800 mPa.s (measured in 25% strength by weight aqueous solution at 25° C.). Polyalkylenepolyamines can also be employed as they are obtained in their preparation, i.e. as a solution in water.

Polyethylenepolyamines which have a molecular weight of 80,000 to 120,000, a viscosity of 250 to 400 mPa.s (measured in 25% strength by weight aqueous solution at 25° C.) and the lowest possible water pollution potential are preferably employed.

The relative amounts of the two components of the emulsion breaker to be used according to the invention can be, for example, 25 to 75% by weight of poly-DADMAC and 75 to 25% by weight of polyalkylenepolyamine, it being possible for these two components together to make up, for example, 95 to 100% by weight of the emulsion breaker. The relative amounts of the two components are preferably 30 to 40% by weight of poly-DADMAC and 70 to 60% by weight of polyalkylenepolyamine.

It is often of advantage to stabilize the emulsion breaker to be used according to the invention by addition of an acid. Monobasic mineral acids, in particular hydrochloricacid, for example having a concentration of 20 to 39% by weight, are preferred for this. The amount of acid added (calculated without water) can be, for example, up to 5% by weight of the emulsion breaker to be employed.

The breakers to be used according to the invention are in general employed in aqueous solution. Such solutions can comprise, for example, 5 to 60% by weight of the breaker. They preferably comprise 20 to 50% by weight of the breaker. The breaker is calculated here as the sum of the anhydrous components. Such solutions are homogeneous, viscous and miscible with water in all proportions.

The optimum amount of breaker in respect of the oil emulsion to be broken can be determined in a simple manner by a routine series of experiments. It is in general 0.01 to 0.2% by weight, often 0.015 to 0.1% by weight of breaker (without water contents).

Breaking of oil emulsions with breakers to be employed according to the invention can be carried out at various temperatures, for example at 0° to 80° C. Temperatures of 10° to 30° C. are preferred.

The time required for breaking oil emulsions in the manner according to the invention depends not only on the particular breaker employed and the specific stability of the oil emulsion to be broken, but also on a number of other parameters, for example the concentration of the breaker, the temperature and the geometry of the container in which breaking is carried out. Depending on the circumstances which exist, for example, 10 minutes to 10 hours is to be expected as the duration of breaking according to the invention.

The two phases present after the process according to the invention has been carried out can be processed, for example, as follows: the aqueous phase can in general be passed to the main outfall after treatment with one or more further breakers to remove the last oil contents (see, for example, DE-OS (German Published Specification) 4 009 760). The oily phase can in general be put to thermal use (combustion) or else, after further treatment steps (for example secondary breaking, centrifugation, desorption, refining), can be used as a material.

The breakers to be employed according to the invention have the advantage that they are active over a wide concentration range. This also means that oil emulsions of varying composition can be broken with them without particular effort.

At the usual processing temperatures, substantial separation is in general already achieved after a short action time, with a sharp separation between the oily and aqueous phase, the water separated off being largely free fr/om oil and the oil separated off being largely free from water. The oily phase separated off has a low viscosity and good flow properties.

EXAMPLES

All the viscosity measurements were made with a Haake Rotovisko RV 12 with measuring head M 150 at 20° C.
Preparation

Example 1

50 g of polyalkylenepolyamine which had been obtained in accordance with Example 1 of DE-OS (German Published Specification) 2 833 654 were brought from pH 8.2 to a pH of 6.0 with concentrated technical grade hydrochloric acid. During this procedure, heating from 22° C. to 35° C. occurred. Thereafter, 50 g of poly-DADMAC (Floerger FL 45 CLV from SNF) were stirred in.

Example 2

50 g of the polyalkylenepolyamine used in Example 1 were mixed with 50 g of the poly-DADMAC used in Example 1. This mixture was brought from pH 8.2 to a pH of 6.0 with concentrated technical grade hydrochloric acid. During this procedure, the mixture heated up from 22° C. to 32° C.

Use

Emulsion-breaking operations were carried out with 4 different cooling lubricant emulsions from the car industry. Details can be seen from the following table.

| Example No. | Breaker | Viscosity of the breaker [mPa · s] at 100 s$^{-1}$ in 27 % strength aqueous solution | Amount of breaker required [g/m$^3$] | | | | Viscosity of the creamed oily phase [mPa · s ] at 30 s$^{-1}$ |
|---|---|---|---|---|---|---|---|
| | | | Emulsion 1 | Emulsion 2 | Emulsion 3 | Emulsion 4 | |
| 3 | from Example 1 | 590 | 625 | 1300 | 250 | 2750 | 2310 |
| 4 | from Example 2 | 530 | 725 | 1500 | 275 | 4000 | 2210 |
| 5 | V 1 | 330 | 1200 | 2150 | 575 | 6750 | 1740 |
| 6 | V 2 | 320 | 1200 | 2150 | 575 | 6750 | 1720 |
| 7 | V 3 | 4060 | 425 | 1050 | 250 | 3000 | 4615 |
| 8 | V 4 | 2080 | 450 | 1100 | 275 | 3250 | 3820 |

Examples 5 to 8 are for comparison. The breakers employed were: V 1=polyalkylenepolyamine as used in Example 1, V 2=V1 adjusted to pH 6 with hydrochloric acid, V 3=poly-DADMAC HOE S 3954 from Hoechst and V 4=poly-DADMAC as used in Example 1.

It can be seen from Examples 3 to 8 that less breaker is required according to the invention compared with V 1 and V 2, the viscosity of the creaming oily phase increasing only moderately, and that in the case of V 3 and V 4, it is already necessary to use high-viscosity breaker solutions, somewhat less breaker is required than according to the invention, but above all the oily phase which creams has a very high viscosity and can be handled only with difficulty.

It is furthermore surprising that less of the breakers to be employed according to the invention is used than corresponds to the sum of the individual components. Taking into account that the breakers according to the invention employed in Examples 3 and 4 each comprise 50:50 parts by weight of polyalkylenepolyamine and poly- DADMAC, it was to be expected that 50% of the amount of V 1 or V 2 required (see Examples 5 and 6)+50% of the amount of V 4 required (see Example 8) gives the required amount of the breakers according to the invention. In fact, the proportions in emulsion 1, however, are as follows: 1200 g/m$^3$ of V 1 or V2 and 450 g/m$^3$ of V 4 are required. For the breakers according to the invention employed in Examples 3 and 4, this gives a theoretical amount of 600+225=825 g/m$^3$s. In fact, however, only 625 and 725 g/m$^3$ respectively are used, that is to say significantly more than 10% less than expected. The proportions are similar in the case of the other emulsions; specifically, in the case of emulsion 2 a theoretical amount of 1075 +550=1625 g/m³ and an actual requirement of 1300 and 1500 g/m³ respectively, in the case of emulsion 3 a theoretical amount of 287.5+137.5=425 g/m³ and an actual requirement of 250 and 275 g/m³ respectively, and in the case of emulsion 4 a theoretical amount of 3375+1625= 5000 g/m³ and an actual requirement of 3750+4000 g/m³ respectively.

What is claimed is:

1. A process for breaking oil emulsions, wherein mixtures which comprise poly-diallyldimethylammonium chloride and polyalkylenepolymaine are employed as breakers, wherein the relative amounts of poly-diallyldimethylammonium chloride to polyalkylenepolyamine are 25 to 75:75 to 25% by weight, said poly-diallyldimethylammonium chloride, as a 35% strength by weight solution in water, having a viscosity of 2,000 to 20,000 mPa.s at 25° C., and said polyalkylenepolyamine, as a 25% strength by weight solution in water, having a viscosity of 200 to 800 mPa.s at 25° C.

2. The process of claim 1, wherein the breaker mixture comprises up to 5% by weight of a monobasic mineral acid.

3. The process of claim 1, wherein the breaker comprises poly-diallyldimethylammonium chloride and polyalkyleneamine to the extent of 95 to 100% by weight.

4. The process of claim 3, wherein the relative amounts of poly-diallyldimethylammonium chloride:polyalkylenepolyamine are 30 to 40:70 to 60% by weight.

5. The process of claim 1, wherein the breaker is employed as an aqueous solution which comprises 5 to 60% by weight of the sum of the anhydrous components poly-diallyldimethylammonium chloride and polyalkylenepolyamine.

6. The process of claim 1, wherein 0.01 to 0.2% by weight of breaker, calculated without water contents, based on the emulsion to be broken, is employed.

* * * * *

UNITED STATES PATENT AND TRADEMARK OFFICE
CERTIFICATE OF CORRECTION

PATENT NO.  : 5,707,531
DATED       : January 13, 1998
INVENTOR(S) : Lehmann, et al.

It is certified that error appears in the above-indentified patent and that said Letters Patent is hereby corrected as shown below:

Col. 6, claim 3    Delete " polyalkyleneamine " and
lines 2-3          substitute -- polyalkylenepolyamine --

Signed and Sealed this

Twenty-fourth Day of November, 1998

Attest:

BRUCE LEHMAN

Attesting Officer     Commissioner of Patents and Trademarks